Jan. 30, 1945.  E. J. DUNHAM  2,368,121
INDUSTRIAL TRUCK
Filed June 7, 1943  6 Sheets-Sheet 1
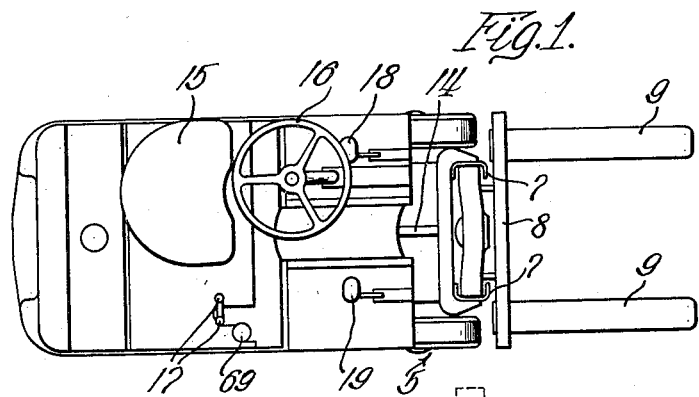
Fig.1.
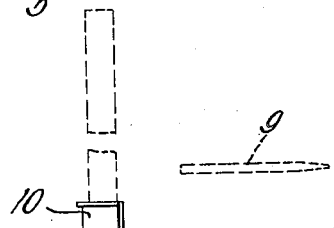
Fig.2.
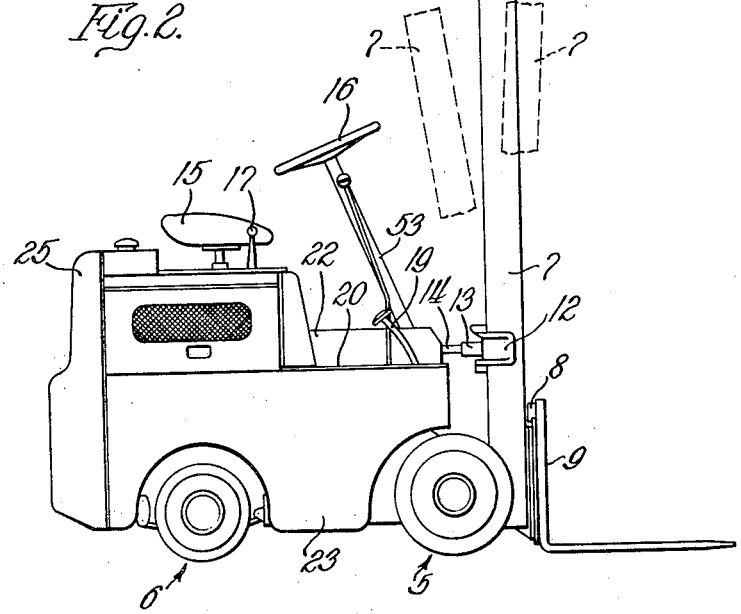
INVENTOR.
Elmer J. Dunham
BY Walter E. Schirmer
ATTY.

Jan. 30, 1945. E. J. DUNHAM 2,368,121
INDUSTRIAL TRUCK
Filed June 7, 1943 6 Sheets-Sheet 3

INVENTOR.
Elmer J. Dunham
BY Walter E. Schirmer
Atty.

Jan. 30, 1945.  E. J. DUNHAM  2,368,121
INDUSTRIAL TRUCK
Filed June 7, 1943  6 Sheets-Sheet 6

INVENTOR.
Elmer J. Dunham
BY Walter E. Schirmer
ATTY.

Patented Jan. 30, 1945

2,368,121

UNITED STATES PATENT OFFICE 2,368,121

INDUSTRIAL TRUCK

Elmer J. Dunham, Battle Creek, Mich., assignor to Clark Equipment Company, Buchanan, Mich., a corporation of Michigan Application June 7, 1943, Serial No. 490,109

10 Claims. (Cl. 214—113)

This invention relates to industrial trucks and more particularly is concerned with the construction of industrial trucks employed for operation in warehouses, factories, loading docks, yards and the like where material handling presents a problem. The present truck is particularly designed for operation in narrow aisles and passageways, and into and out of box cars.

One of the primary objects of my invention is to provide a simple, compact industrial truck having finger mechanism mounted on a pair of uprights for vertical movement, the uprights being pivotally arranged for movement forwardly and rearwardly to assist in carrying and transporting the load.

Another object of the present invention is to provide a simplified tilting mechanism for the uprights requiring the use of only a single tilting cylinder centrally located relative the truck chassis.

Still another feature of the present invention is assembling the engine, clutch, transmission and axle as a rigid power unit, this entire assembly being then pivotally mounted relative the frame so that the frame may be supported at one end by the use of resilient mounting of the engine thereon, and at the other end is pivotally mounted about the arms of the drive axle.

Still another feature of the present invention is the provision of a novel type of drive axle assembly bolted directly to the rear end wall of the transmission case, the assembly including a double reduction of compact design.

Other features and advantages of the present invention will appear more fully from the following detailed description, which, taken in conjunction with the accompanying drawings, will disclose to those skilled in the art the particular construction and operation of a preferred form of my invention.

In the drawings:

Figure 1 is a top plan view of an industrial truck according to the present invention;

Figure 2 is a side elevational view of the truck shown in Figure 1.

Figure 3:
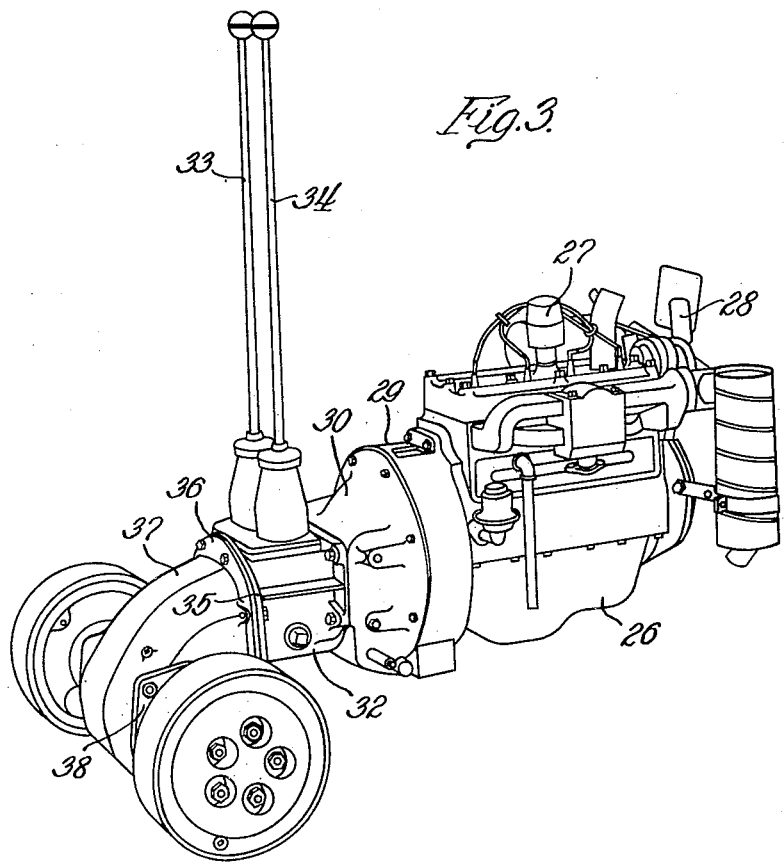
Figure 3 is a perspective view of the power unit assembly and drive axle.
Figure 4:
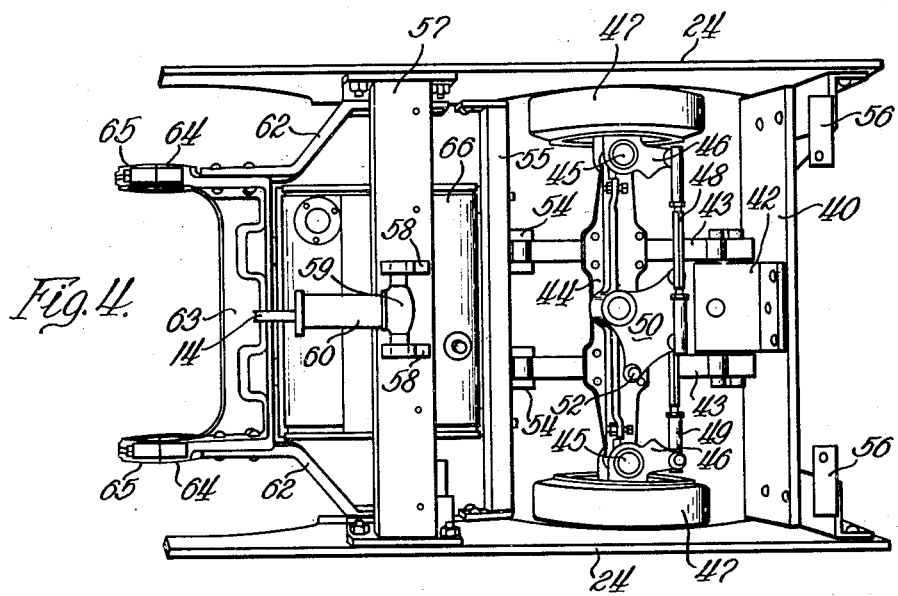
Figure 4 is a top view of the frame assembly and steering axle.
Figure 5:
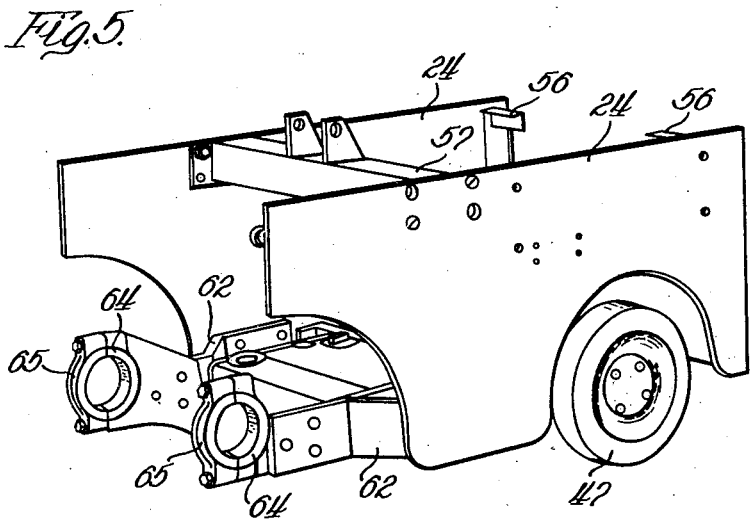
Figure 5 is a side perspective view of the construction shown in Figure 4.

Referring now in detail to Figures 1 to 5 inclusive, I have provided an industrial truck comprising the drive axle 5, the steering axle 6 and the load supporting uprights 7 mounted forwardly of the drive axle 5. Mounted for vertical movement within the uprights 7 is a load supporting carriage 8 carrying lift fingers or forks 9 which are adapted to be engaged under a load to receive the load thereon, and through suitable hydraulic mechanism to be raised on the uprights to the dotted line position shown in Figure 2. The uprights at their upper end are provided with a cross member 10 providing a rigid spacing, and intermediately thereof there is provided a cross member 12 which receives one end 13 of a piston rod 14, the opposite end of this rod extending into a cylinder adapted to be suitably actuated through a hydraulic system for pushing or pulling on a rod 14 to produce tilting movement of the uprights forwardly or rearwardly as indicated by the dotted lines as shown in Figure 2.

On the top of the truck body there is provided an operator seat 15 which receives the operator who steers the truck through the conventional steering wheel 16, and controls the operation of the upright assembly and load supporting means through a pair of hydraulic control levers adjacent the seat 15. Suitable clutch and brake pedals 18 and 19 project through the floorboard 20 of the vehicle, the floorboard 20 being interrupted centrally of the vehicle by the member 22 which forms a protective housing for the tilting cylinder to which the piston rod 14 is connected.

The two sides of the truck are adapted to be formed of suitable counterweight members 23 which are bolted to the sides of the frame plate members 24 for adding weight to the truck. A corresponding counterweight member 25 is bolted to the rear end of the truck for counterbalancing the loads on the forks 9.

Referring now in detail to the power unit which is shown in Figure 3, this comprises an engine 26 having the usual engine accessories such as the air cleaner 27, fan 28 and having at its rear end the flywheel housing 29.

Piloted in the flywheel housing 29 is the flanged end of the clutch or bell housing 30 which contains the usual type of friction clutch, and has the transmission 32 extending rearwardly therefrom. This provides a rigid mounting of the transmission and clutch on the flywheel housing. The transmission is of the two-speed type, having one gear shift lever 33 controlling high and low speeds and having a second gear shift lever 34 controlling the direction of drive so that the vehicle may be driven in either direction in either speed. The transmission case 32 terminates in a flange portion 35 to which is bolted the flange portion 36 of a differential housing 37. This housing in turn has bolted thereto arms 38 forming an axle for the vehicle. The details of the construction of the differential and axle will be described in connection with Figures 6 to 8, inclusive.

Returning now to Figures 5 and 4, the frame plates 24 of the truck chassis are relatively heavy steel plate, and are spaced apart at one end by the transverse plate member 40 which in turn carries an angle shaped bracket 42 forming a support for the ends of springs 43 which in turn resiliently support the frame on the steering axle 44.

The axle 44 carries at its ends king pins 45 upon which are mounted the steering spindles 46 which carry the steering wheels 47. The two spindles 46 are interconnected through the tie rods 48 and 49 to a steering bracket 50 which has a portion 52 adapted to be controlled by a suitable tie rod connected to the lower end of the steering post 53 shown in Figure 2. The opposite ends of the springs 43 are fastened on suitable brackets 54 carried on a transverse spacing channel 55 extending between the side plates 24 intermediate their ends. Above the end plate 40 there is provided suitable brackets 56 operating to support the radiator for the engine 26 thereon, the engine itself being supported by means of suitable brackets on the plate 40. Beyond the radiator supported on brackets 56 the counterweight 25 is secured, the counterweight preferably having an opening therein providing for entrance of air into the radiator.

Forwardly of the transverse spacing member 55, there is provided a second cross member 57 carrying two forwardly extending brackets 58 suitably apertured to receive therebetween the end 59 of a cylinder 60. The cylinder 60 carries a piston therein having the piston rod 14 connected for tilting the uprights. Thus, the reaction of the piston is taken by the transverse member 57.

Riveted or bolted to the depending ends of the side plates 24 just forwardly of the transverse member 55 are a pair of inwardly converging brackets 62 which terminate at their forward ends in spaced apart plates adapted to receive the reinforcing cradle member 63. The cradle member 63 in turn carries forwardly projecting bearing brackets 64 which, with the bearing caps 65, provide for the mounting of the entire chassis for rotation about the arms 38 of the driving axle. This will be described in detail hereinafter.

Mounted between the converging ends of the bracket 62 and the transverse member 55 and disposed in substantially the same plane as the brackets 62 is a gas tank member 66, thus providing a convenient location for this member.

Figure 6:
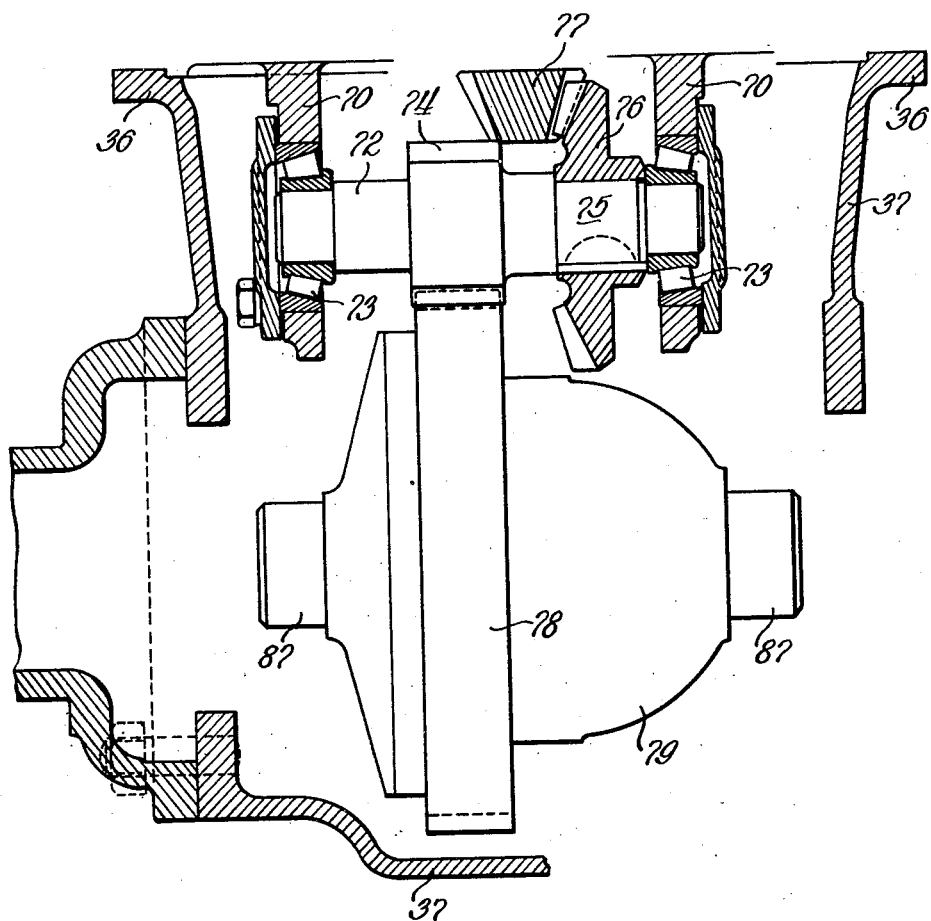
Figure 6 is a horizontal sectional view through the differential and drive axle.
Figure 7:
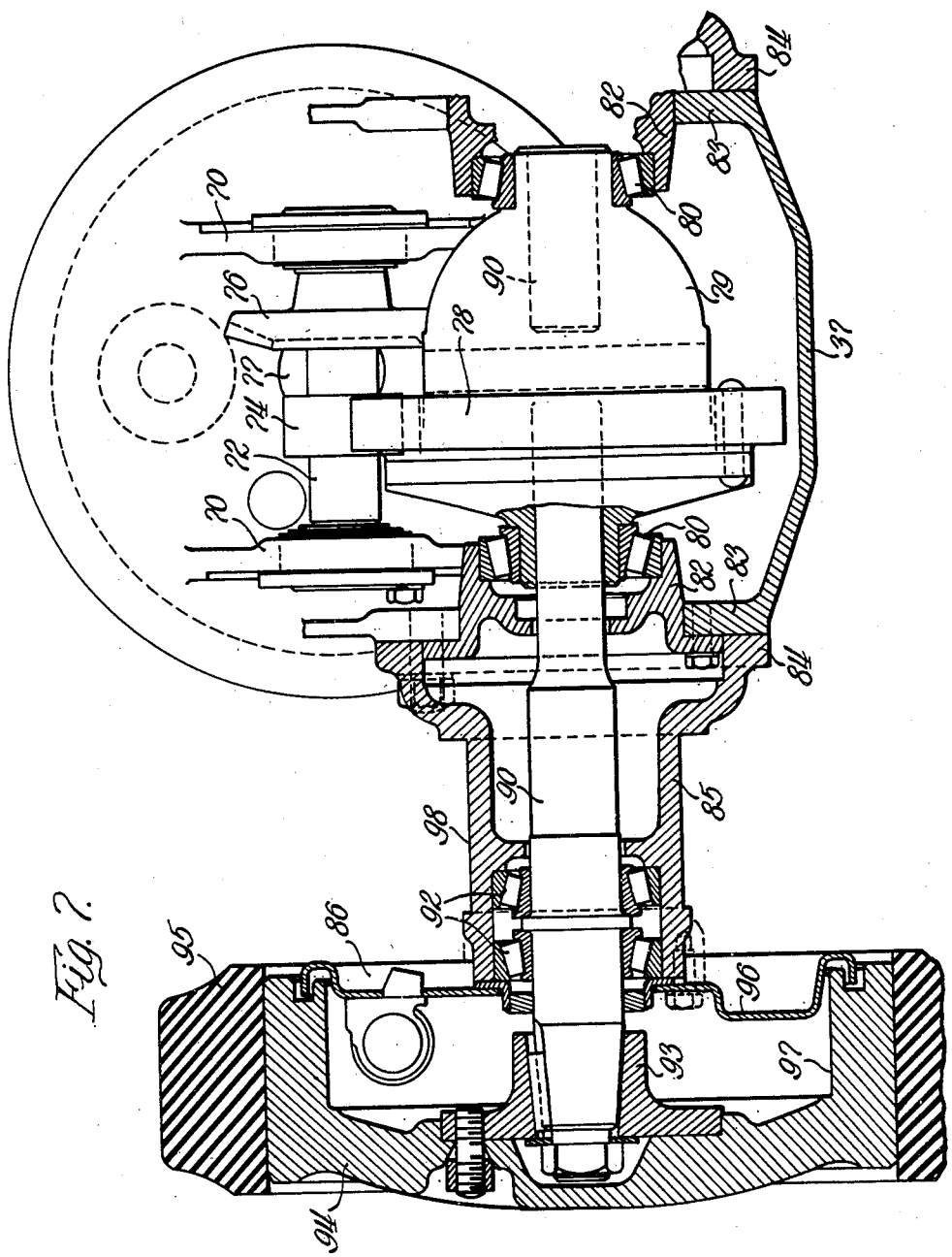
Figure 7 is a vertical sectional view through the drive axle.
Figure 8:
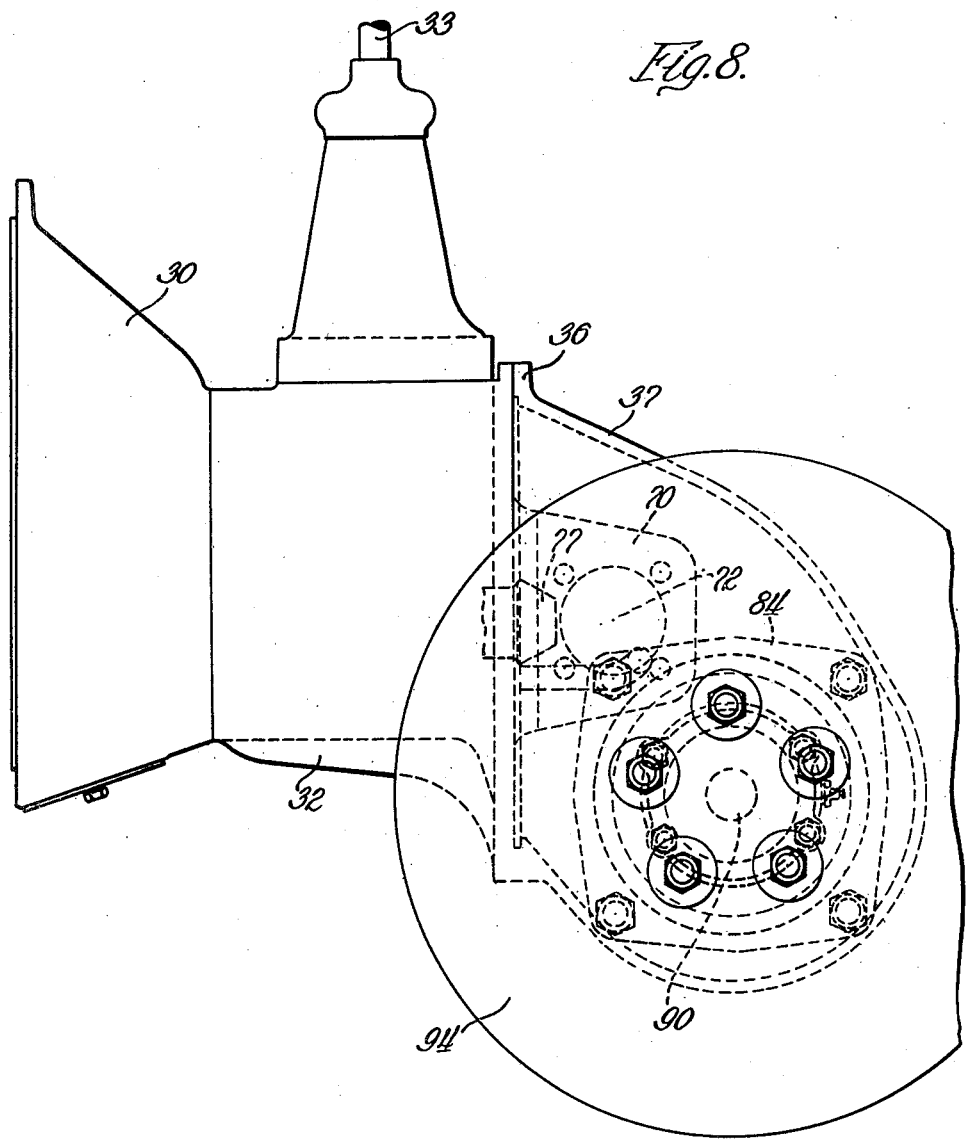
Figure 8 is an elevational view of the transmission and drive axle mechanism.

Considering now in detail Figures 6 to 8 which are directed to the driving axle construction, the transmission case 32 is provided with rearwardly extending ear portions 70 adapted to provide suitable support for a transverse shaft 72 extending therebetween and mounted in suitable thrust bearings 73 secured in the ear portions 70. The shaft 72 has formed thereon the spur gear portion 74 and has a reduced portion 75 adapted to receive the bevel ring gear 76 keyed or otherwise non-rotatably secured thereto.

The gear 76 is adapted to be driven by the bevel pinion 77 extending from countershaft of the transmission 32 and in turn drives the gear 74 on shaft 32, the gear 74 having constant meshing engagement with the spur ring gear 78 bolted securely to the differential case 79.

The differential case 79 is mounted within the differential housing 37 and is rotatably supported by the bearings 80 upon suitable bearing retaining sleeves 82 bolted or otherwise secured to the end walls 83 of the differential housing. These end walls also are adapted to receive the flanged portions 84 of the housing arms 85 extending laterally from each side of the differential case toward the drive wheels 86. The hub portions 87 of the differential case 79 are each adapted to receive the splined inner ends of drive shafts 90, these drive shafts extending through the housing arms 85 and being suitably journaled in the outer ends of these arms as by means of the opposite tapered bearings 92. The projecting ends of the shafts 90 are adapted to receive the hubs 93 of the wheels 94, which wheels in turn carry the usual solid rubber tires 95. The ends of the housing arms 85 about the bearings 92 are so designed as to receive the backing plates 96 upon which the hydraulic brake assemblies for the wheels are mounted. In this connection it will be noted that the internal surface 97 of the wheels 94 is so machined as to provide the proper braking surface.

It will be apparent from this description that from the transmission shaft, which carries the bevel pinion 77, there is a double reduction of gears to the differential case 79, this being provided by the bevel ring gear 76 and the two spur gears 74 and 78. Also by reason of this construction and as will be more apparent in Figure 8, the spur pinion gear 74 is arranged above and rearwardly of the differential ring gear 78 so that a dropped axle effect is produced with the axis of the axle shaft 90 disposed considerably below the axis of the shaft 72. As a result, the power unit consisting of the engine 26 and transmission 32 is disposed at a sufficient height to provide the desired ground clearance and also to be readily supported within the frame shown in Figures 4 and 5 while the axle itself is disposed in proper position for mounting in the journals 64.

With respect to this latter feature, it will be noted that each of the housing arms 85 is provided with an annular machined surface 98 adapted to be journalled within the bearings 64 of the frame members whereby the entire chassis is mounted about the housing arms. The surfaces 98 also provide means for rotatably supporting the uprights at their lower ends, the uprights being provided with suitable brackets having journal portions engaging about these surfaces.

It is therefore believed apparent that I have provided a novel type of industrial truck construction which is of compact but rigid design, capable of utilizing but small lateral space for operation and yet having all of the features of more elaborate and expensive types of fork trucks.

I therefore do not intend to be limited to the exact details herein shown and described, but only insofar as designed by the scope and spirit of the appended claims.

I claim:

1. In an industrial truck, a chassis, a rigid power unit consisting of engine, transmission and drive axle, means journalling one end of said chassis on the arms of said drive axle, a transverse floor board secured to said chassis, and extending over said transmission, a pair of load supporting uprights pivotally mounted at their lower ends about the arms of said drive axle adjacent the chassis journal means, a tilt cylinder pivotally mounted on said chassis and extending in the plane of said floorboard, a protecting housing interrupting said floorboard to enclose said cylinder, and a piston in said cylinder connected to said uprights for tilting them about said pivotal mounting.

2. In an industrial truck, a chassis, a drive axle under one end of said chassis having oppositely extending housing arms, laterally spaced uprights forwardly of said axle having means pivotally mounting them at their lower ends about said arms, means pivotally mounting said chassis at one end about said arms inwardly of said uprights, a transverse cross-member in said chassis, a tilt cylinder, means pivotally mounting said cylinder at one end on said cross-member, a piston in said cylinder, and means connecting said pistons to said uprights.

3. The truck of claim 2 wherein said last-named means includes a bracket rigidly interconnecting said uprights at a point adjacent the lower ends thereof and above said pivotal mounting.

4. An axle and drive unit assembly for an industrial truck comprising an axle housing having a central differential housing portion provided with an offset vertical bolt flange portion, a transmission having a countershaft provided with a bevel pinion and having laterally spaced journal ears on opposite sides of said pinion, a transverse lay shaft journalled in said ears and carrying a ring gear and a spur gear portion, said pinion driving said ring gear, a differential in said housing having an annular spur gear driven from said spur gear portion on said shaft, said transmission having a mating bolt flange portion rigidly secured to said differential housing flange portion with said ears and pinion disposed within said differential housing portion.

5. The assembly of claim 4 wherein the axis of said pinion lies above a horizontal plane through the axis of said differential.

6. The assembly of claim 4 wherein the axis of said lay shaft is disposed above and parallel to the axis of said differential.

7. In combination, a transmission including a housing having an annular bolt flange, said transmission having outwardly projecting ears, a countershaft having a bevel pinion disposed intermediate said ears, a lay shaft having its ends journalled in said ears and having a ring gear driven by said pinion, a differential housing, a differential case therein having an external spur gear thereon and a spur gear portion on said shaft driving said differential spur gear, said differential housing having an annular bolt flange secured to said transmission flange and enclosing said shaft and pinion.

8. In an industrial truck, a chassis having journal portions at one end thereof, a rigid power unit assembly including an engine, transmission and drive axle having oppositely extending housing arms, journal surfaces on said arms for pivotally mounting said chassis journals thereon, and a pair of uprights having means at their lower ends pivotally mounting said uprights on said surfaces adjacent said chassis journals.

9. Drive means for an industrial truck including a transmission housing having a bolt flange at one end thereof and laterally spaced ears projecting beyond said flange, change speed gearing in said transmission and including a rearwardly extending countershaft having a pinion gear located between said ears, a drive axle housing bolted to said flange and enclosing said ears and pinion gear, a transverse shaft journalled in said ears and having a ring gear driven by said pinion gear, a differential in said housing having an external spur gear, and a spur pinion on said transverse shaft driving said differential gear.

10. Drive means for an industrial truck including a drive axle housing having a differential provided with an external spur gear, a transmission housing rigidly bolted to said axle housing and having a rearward extension into said axle housing including a transverse shaft carrying a ring gear, a driving pinion on said shaft meshing with said spur gear, and a pinion extending rearwardly from said transmission housing into said axle housing and driving said ring gear.

ELMER J. DUNHAM.